United States Patent
Kittaneh et al.

(10) Patent No.: US 10,225,512 B2
(45) Date of Patent: Mar. 5, 2019

(54) VIDEO RECORDING SYSTEM AND METHOD

(71) Applicant: OCLU LLC, Tempe, AZ (US)

(72) Inventors: Firas Kittaneh, Tempe, AZ (US); Hugo Martin, Oxfordshire (GB); Gregory Dean Hall, Johannesburg (ZA)

(73) Assignee: OCLU LIMITED, East Grinstead (GB)

( * ) Notice: Subject to any disclaimer, the term of this patent is extended or adjusted under 35 U.S.C. 154(b) by 0 days.

(21) Appl. No.: 15/084,334

(22) Filed: Mar. 29, 2016

(65) Prior Publication Data
US 2017/0195616 A1   Jul. 6, 2017

(30) Foreign Application Priority Data
Jan. 5, 2016 (GB) .................... 1600165.3

(51) Int. Cl.
| H04N 5/77 | (2006.01) |
| H04N 21/433 | (2011.01) |
| G11B 20/10 | (2006.01) |
| H04N 5/91 | (2006.01) |
| H04N 5/765 | (2006.01) |

(52) U.S. Cl.
CPC ....... *H04N 5/772* (2013.01); *G11B 20/10527* (2013.01); *H04N 5/765* (2013.01); *H04N 5/91* (2013.01); *H04N 21/433* (2013.01); *G11B 2020/10537* (2013.01); *G11B 2020/10851* (2013.01)

(58) Field of Classification Search
CPC .... G11B 20/10527; G11B 2020/10851; G11B 2020/10537; H04N 5/772; H04N 5/91
USPC ..... 348/143, 231.9; 386/224, 228, 248, 295, 386/289, 241, 242
See application file for complete search history.

(56) References Cited

U.S. PATENT DOCUMENTS

| 8,692,882 B2 * | 4/2014 | DeKeyser ................ H04N 7/18 348/143 |
| 9,406,336 B2 * | 8/2016 | Bose ...................... H04N 7/188 |
| 9,465,468 B2 * | 10/2016 | Lee ........................ H04N 5/772 |
| 2006/0176369 A1 | 8/2006 | Meritt |

(Continued)

FOREIGN PATENT DOCUMENTS

CA          2463117          8/2004

*Primary Examiner* — Thai Q Tran
*Assistant Examiner* — Stephen R Smith
(74) *Attorney, Agent, or Firm* — Weiss & Moy, P.C.; Jeffrey D. Moy

(57) ABSTRACT

The present invention relates to a method of recording a video data stream, the method comprising:
  receiving a video data stream from a camera device;
  monitoring for an input from a user;
  in response to receipt of a first input from a user, commencing storage of the received video data stream in a data storage device;
  in response to receipt of a second input from a user, halting storage of the received video data stream in the data storage device;
in response to receipt of a third input from a user, halting storage of the received video data stream in the data storage device, deleting data stored in the data storage device since the last commencement of storage of the video data stream, and commencing further storage of the received video data stream in a data storage device.
The present invention further relates to a video recording system for carrying out the aforementioned method.

7 Claims, 3 Drawing Sheets

(56) References Cited

U.S. PATENT DOCUMENTS

| | | | |
|---|---|---|---|
| 2008/0170130 A1* | 7/2008 | Ollila | H04N 5/2252 |
| | | | 348/211.99 |
| 2010/0007731 A1 | 1/2010 | Joseph et al. | |
| 2011/0273590 A1* | 11/2011 | Kojima | H04N 5/77 |
| | | | 348/231.99 |
| 2011/0280551 A1* | 11/2011 | Sammon | G11B 27/034 |
| | | | 386/289 |
| 2014/0270689 A1 | 9/2014 | Chau et al. | |
| 2014/0313336 A1 | 10/2014 | Predmore | |

* cited by examiner

VIDEO RECORDING SYSTEM AND METHOD

The present invention relates to a method of recording a video data stream and a video recording system operable to carry out the aforementioned method.

It is often desirable to record specific spontaneously occurring moments in time. However, as a result of their spontaneous occurrence it is impossible to predict exactly when such moments will take place particularly, for example, when the event of interest is an unexpectedly funny or cute moment or a particularly interesting or impressive sporting moment or the like.

In an effort to capture spontaneous entertaining, sporting or active moments, it is becoming more popular for participants to wear cameras that can be attached to either their person or to an item of equipment that they are wearing or using in order to capture video shots of the activity they are participating in. For example, small cameras may be mounted on the helmets of bikers, on headbands worn by runners, or on equipment such as surfboards and the like so that participants can capture memorable events that take place during the activity.

As the memorable moments may be spontaneous and/or sporadic, it is necessary to record a large amount of footage in order to ensure that the camera captures the specific short moment of interest during the activity, particularly as the participant may not wish to, or be able to, stop the activity, check the camera and start deleting unwanted footage whilst the activity is being undertaken. This is especially true where the activity, by its very nature, prevents viewing and deletion of video footage during the activity, for example, during climbing, watersports, biking and the like. However, recording in a normal manner throughout the activity may result in many hours of video footage that not only requires significant memory in the camera to store the footage as it accumulates during the activity, it also requires a significant amount of time on the part of the user to review the recordings post-activity to identify the specific memorable moments of interest that the participant wishes to save. In addition, isolating that memorable moment from the hours of video footage that has been captured will also require associated editing time.

There is therefore a need for a camera and method of operation that allows a more efficient way to capture video footage of specific memorable moments occurring during a period of recording time, whilst avoiding onerous and time-consuming video footage reviewing and editing after the activity has been completed.

The present invention seeks to address the problems of the prior art.

A first aspect of the present invention provides a method of recording a video data stream, the method comprising:
receiving a video data stream from a camera device;
monitoring for an input from a user;
in response to receipt of a first input from a user, commencing storage of the received video data stream in a data storage device;
in response to receipt of a second input from a user, halting storage of the received video data stream in the data storage device;
in response to receipt of a third input from a user, deleting data stored in the data storage device since the last commencement of storage of the video data stream, and commencing further storage of the received video data stream in a data storage device.

Thus, a user may provide a first input to the camera device to initiate the recording. The recording, once initiated will continue until such time as the user provides a further input to the camera device. Where the input is the second input referred to above, the recording will be halted. Thus the recording will be halted and the video data stream recorded to date retained within the data storage device.

Alternatively, if no event of interest has occurred since the recording commenced, the user may provide the third input referred to above to the camera device. This will result in the recording being halted and the received video data stream held in the data storage device will be deleted and the further storage of received video data stream commenced. This allows a user to effectively discard the video data stream stored since the storage operation was previously initiated and immediately resuming the recording process.

In one embodiment, in response to the receipt of a second input from a user and halting storage of the received video data stream in the data storage device, the stored received video data is saved in a memory device.

Thus, in the event that an event of interest has taken place during the storage of the received video stream, that the user wishes to retain, then the second input to the camera by the user will result in the stored video data being saved to a memory device. Thus the user is able to retrospectively save the desired footage that includes an event of interest that the user wishes to retain i.e. the user can wait until an event of interest takes place that they wish to retain a recording of, and can then initiate the saving of the specific recording that contains that event.

Preferably, the method further comprises commencing farther storage of the received video data stream in a data storage device after saving the stored received video data stream in the memory device.

Thus the present invention allows the user to seamlessly restart a new recording session while saving the previously stored video data stream containing the event of interest. In this way the user can be sure of not missing a further event of interest as the storing of the ongoing video data stream will immediately restart after the previous recording has been halted to allow the previous video data to be saved.

It is to be appreciated that the present invention allows the user to control the length of the recordings, as the video data stream storage can be halted and restarted at any time. The user input determines the time at which the storage of the video data steam is halted, whether the halted storage i.e. recording is deleted or saved to a memory device for later retrieval and viewing. Thus, the user may decide at any point to halt the storage of the video stream in the event that nothing of interest has occurred and instruct the camera to delete the recording from the data storage device.

A further aspect of the present invention provides a video recording system comprising:
a camera device operable to receive an optical input and to output a video data stream relating to a received optical input;
a user input means arranged to be operable by a user of the system, and operable to provide user input signals for the system;
a data storage device operable to store data therein;
a processing device operable to receive a video data stream from the camera device, to receive user input signals from the user input means, and to control data storage in the data storage device, wherein the processing unit is operable:

in response to receipt of a first user input signal from the user input means, to commence storage of a received video data stream in the data storage device;

in response to receipt of a second input signal from the user input means, to halt storage of the received video data stream in the data storage device; and in response to receipt of a third input signal from the user input means, to halt storage of the received video data stream in the data storage device, and to delete data stored in the data storage device since the last commencement of storage of the video data stream, and commence further storage of the received video data stream in a data storage device.

In one embodiment, the system further comprises a memory device operable to receive the stored video data from the data storage device in response to the second input signal from the user input means.

Preferably, the processing unit is operable to commence further storage of the received video data stream in the data storage device after saving the stored received video data in the memory device.

The user interface may comprise a conventional display and associated buttons or switches, or may comprise a conventional touch screen display. However, preferably the user interface comprises a button or switch that can be operated by a user without the need to access a visual display.

For example, the camera interface may provide a button or touch screen portion that is operable by a user to input a first input signal to the camera device to initiate the recording process. This same button or touch screen portion may be further operable by a user to input a second signal to halt the recording process, thereby retaining the recorded video data stream in the data storage device. The camera interface may further provide a second button or touch screen portion that is operable by a user to input a third input signal to the camera device to halt the recording, delete the stored video data stream from the data storage device and recommence the recording process. Thus, the recording process may be operable by a user using just two buttons or touch screen portions on the user interface.

That said, it is to be appreciated that more than two buttons or touch screen portions may be provided for operation by a user to input the first, second and third input signals to the camera device.

An embodiment of the present invention will now be described, by way of example only, and with reference to the following figures, in which.

Figure 1:
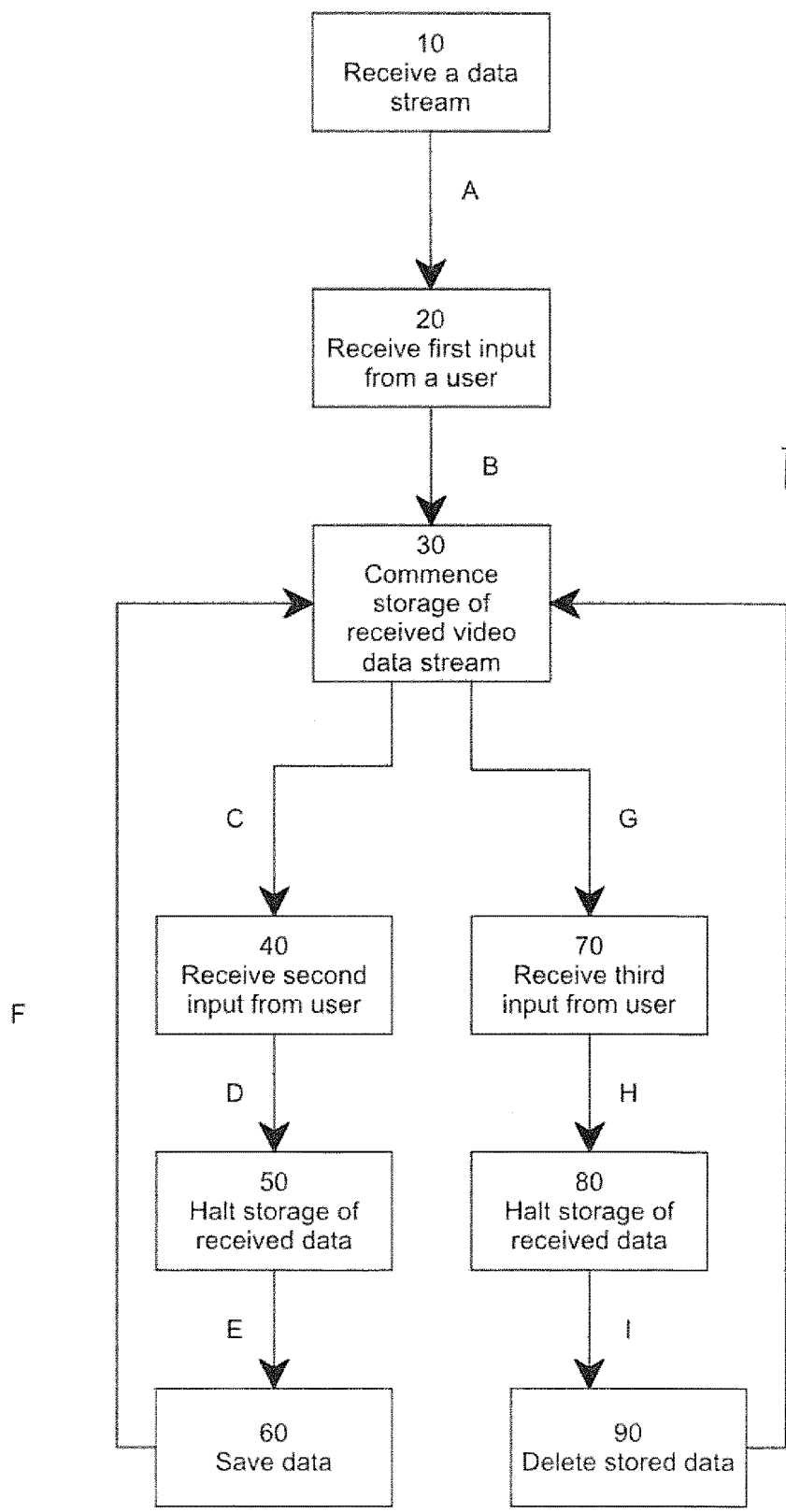
FIG. 1 is a flow-diagram illustration a first embodiment of a method in accordance with a first aspect of the present invention.

The flow diagram of FIG. 1 shows a first embodiment of the method of the present invention. FIG. 1 will now be discussed with reference to the diagrammatic representation of the embodiment of the system of the present invention shown in FIG. 2 and the diagrammatic representation of the user interface of FIG. 3.

Figure 2:
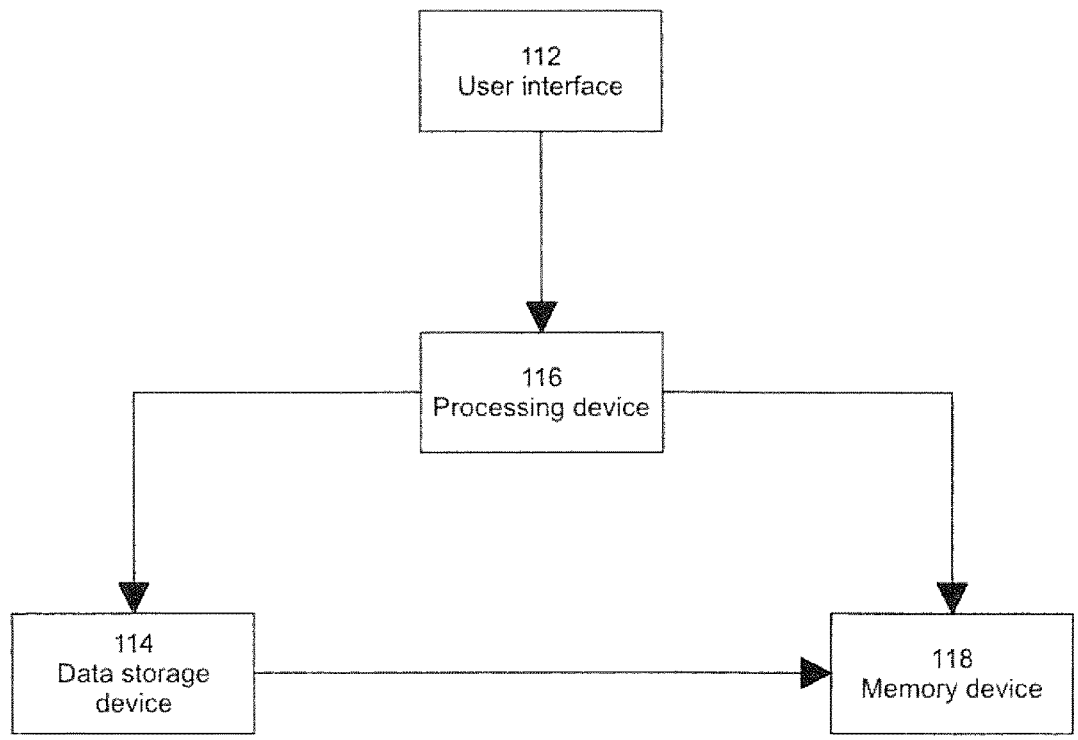
FIG. 2 is a diagrammatic representation of a first embodiment of a system in accordance with a second aspect of the present invention.

When a user (not shown) wishes to capture video footage using the camera system of FIG. 2, the camera 100 is directed towards the activity to be captured. At step A, a user interacts with the camera 100 via user interface 112, using first input member 300 to provide a first input signal to the camera system 100. The user interface 112 transmits the first input signal to processing device 116.

Figure 3:
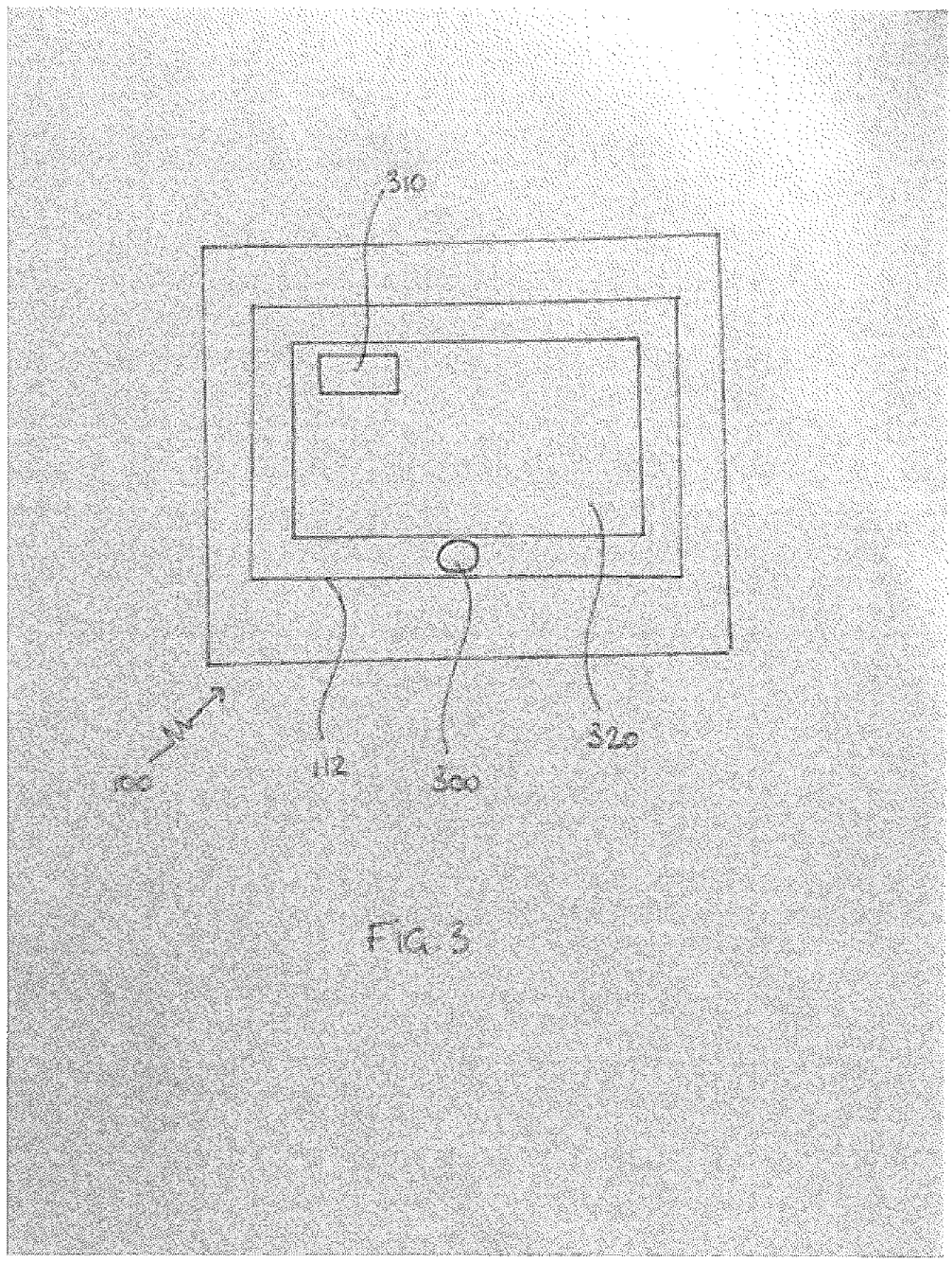
FIG. 3 is a diagrammatic representation of a camera user-interface of a first embodiment of a camera device of the system of FIG. 2

In FIG. 3, first input member 300 is shown as a button. However, it is to be appreciated that first input member 300 may alternatively be a toggle switch, touch screen portion or any other suitable input member know to the skilled person and operable by a user to input a first signal to camera system 100.

On receipt of the first input signal from first input member 300 of user interface 112, processing device 116 recognises the first input signal as an instruction from the user to commence recording and transmit a signal to the data storage device 114 to commence storage of the video data stream being received by the camera system 100 (step B).

The data storage device 114 of camera system 100 will then continue to store received video data until a further signal is received from processing device 116 as a result of user input at the user interface 112.

Thus, the length of the recording can be controlled by the user as the recording will continue until such time as the user provides a further input, via first user input member 300 or second input member 310 of user interface 112 to the processing device 116 via user interface 112.

In FIG. 3, second input member 310 is shown as a touch screen portion of camera viewing screen 320. However, it is to be appreciated that second input member 310 may alternatively be a button, toggle switch or any other suitable input member know to the skilled person and operable by a user to input a further signal to camera system 100.

For example, if during a recording, an event of interest to the user occurs and the user wishes to save the video data stored by the data storage device 114 since input of the signal at Step A, the user can provide a second input, using first input member 300, to processing device 116 via user interface 112 to instruct the camera system 100 to save the video data currently stored by the data storage device 114 (Step C). The processing device 116 receives the input signal from user interface 112 and transmits a corresponding signal to the data storage device 114 to:

1. halt the storage of the received video data (Step D); and
2. transmit the stored video data to memory device 118 (Step E).

On receipt of the transmitted stored video data, the memory device 118 will retain the video data for subsequent retrieval and/or viewing by the user. The recording process may be recommenced by repeating the aforementioned process i.e. inputting first signal via first input member 300 to camera system 100.

Alternatively, if during a recording, no events of interest occur and the user has no interest in saving the video data stored by the data storage device 114 since input of the signal at Step A, the user can provide a third input (rather than the second input referred to above) to processing device 116 via input member 310 of user interface 112 to instruct the camera system 100 to delete the video data currently stored by the data storage device 114 (Step G). The processing device 116 receives the input signal from the user interface 112 and transmits a corresponding signal to the data storage device 114 to:

1. halt the storage of the received video data (Step H);
2. delete the stored video data (Step I); and
3. re-commence storage of the received video data transmitted to the data storage device 114 on receipt by camera system 100.

Thus, the recording process is restarted and the previously recorded video data is deleted.

The method and camera system of the present invention provides a user with the ability to retrospectively save a video recording in order to save video footage of an event of interest. Thus a user can delete unwanted recordings in real time, saving only recordings of interest for later viewing and editing. This prevents the situation arising where a user has hours of video data to view in order to identify the moments of interest. The only saved video data using the camera system 100 of the present invention are the portions of recordings positively selected by the user for saving in memory device 118 for later retrieval. The remaining stored video data is deleted in response to a positive instruction from the user via user interface 112.

Further, the use is not restricted to recordings of a predefined or predetermined length. The length of recording is specifically determined by the user in dependence upon the timing of the subsequent input (i.e. the second or third input signal) by the user since commencement of storage of the video data stream.

It is important to note that the halting and subsequent recommencing of storage of video data happens in quick succession so that the time during which data storage device 114 is not storing the received video data stream is negligible and so continuity of recording is achieved.

It is to be appreciated that, although the method and system of the present invention has been described with reference to the recording of sporting activities and the like, it is as equally applicable to the recording of other non-sporting events, such as family get-togethers and children's parties and the like, where it may be desirable to capture specific moments, but where the user does not want to save footage of the whole event.

The invention claimed is:

1. A method of recording a video data stream, the method comprising:
   receiving a video data stream from a camera device;
   monitoring for an input from a user;
   in response to receipt of a first input from a first single input button by a user, commencing storage of the received video data stream in a data storage device;
   in response to receipt of a second input from a second single input button by the user, halting storage of the received video data stream in the data storage device;
   in response to receipt of a third input from a third single input button by the user, deleting data stored in the data storage device since a predetermine point in the recording, and commencing further storage of the received video data stream in a data storage device, wherein the predetermined point in the recording comprises the last commencement of storage of the video data stream.

2. A method according to claim 1, further comprising:
   in response to the receipt of the second input from the second single input button by the user and halting storage of the received video data stream in the data storage device, the stored received video data stream is saved in a memory device.

3. A method according to claim 2, further comprising commencing further storage of the received video data stream in a data storage device after saving the stored received video data stream in the memory device.

4. A video recording system comprising:
   a camera device operable to receive an optical input and to output video data stream relating to a received optical input;
   a user input arranged to be operable by a user of the system, and operable to provide user input signals for the system;
   a data storage device operable to store data therein;
   a processing device operable to receive a video data stream from the camera device, to receive user input signals from the user input, and to control data storage in the data storage device,
   wherein the processing device is operable:
   in response to receipt of a first user input signal from a first single input button of the user input, to commence storage of a received video data stream in the data storage device;
   in response to receipt of a second input signal from a second single input button of the user input, to halt storage of the received video data stream in the data storage device; and
   in response to receipt of a third input from a third single input button of the user input, deleting data stored in the data storage device since a predetermine point in the recording, and commencing further storage of the received video data stream in a data storage device, wherein the predetermined point in the recording comprises the last commencement of storage of the video data stream.

5. A video recording system according to claim 4, the system further comprising a memory device operable to receive the stored video data stream from the data storage device in response to the second input signal from the user input.

6. A video recording system according to claim 5, wherein the processing device is operable to commence further storage of the received video data stream in the data storage device after saving the stored received video data stream in the memory device.

7. A method of recording a video data stream, the method comprising:
   monitoring for an input from a user;
   in response to receipt of a first input from a first single input button, commencing recording of the video data stream and storing of the video data stream in a data storage device;
   in response to receipt of a second input from a second single input button, halting the storage of the video data stream and saving the video data stream stored in the data storage device;
   in response to receipt of a third input from a third single input button, halting storage of the video data stream and deleting the video data stream stored in the data storage device since a predetermine point in the recording, wherein the predetermined point in the recording comprises the last commencement of storage of the video data stream and commencing further storage of the received video data stream in a data storage device.

* * * * *